US012779650B1

(12) United States Patent
Ridders

(10) Patent No.: US 12,779,650 B1
(45) Date of Patent: Nov. 3, 2026

(54) IMPACT DRIVER ATTACHMENT

(71) Applicant: Thomas Patrick Ridders, Scio, OR (US)

(72) Inventor: Thomas Patrick Ridders, Scio, OR (US)

( * ) Notice: Subject to any disclaimer, the term of this patent is extended or adjusted under 35 U.S.C. 154(b) by 0 days.

(21) Appl. No.: 19/255,771

(22) Filed: Jun. 30, 2025

(51) Int. Cl.
*B25D 17/06* (2006.01)
*B25B 21/02* (2006.01)

(52) U.S. Cl.
CPC .............. *B25D 17/06* (2013.01); *B25B 21/02* (2013.01); *B25D 2217/0015* (2013.01)

(58) Field of Classification Search
CPC .......... E04H 17/263; B25D 2217/0011; B25D 2217/0015; B25D 2217/0019; B25D 17/005; E02D 7/00; E02D 7/04; E02D 13/04; E02D 7/06
See application file for complete search history.

(56) References Cited

U.S. PATENT DOCUMENTS 3,499,497 A * 3/1970 Moore .................. E04H 17/263 175/135
3,961,671 A * 6/1976 Adams .................... E02D 5/801 52/741.11
5,010,710 A * 4/1991 Gray ..................... E04H 17/263 173/90
5,029,427 A * 7/1991 Jewett ................... E04H 17/263 52/741.11
5,086,849 A * 2/1992 Dahl ......................... E02D 7/04 173/90
5,248,002 A * 9/1993 Williams ................. H01R 4/66 173/90
5,462,126 A * 10/1995 Wallace ................ E21B 11/005 173/90
5,598,893 A * 2/1997 Carlson ................. E04H 17/263 173/217
6,182,772 B1 * 2/2001 Lagasse ................ E04H 17/263 173/124
6,963,026 B2 * 11/2005 Brennan .................. H01R 4/66 81/177.85
7,121,357 B1 * 10/2006 Raimondi .............. B25D 17/02 173/90
8,602,285 B2 * 12/2013 Santamarina ....... B25B 23/0035 81/463
9,999,969 B1 * 6/2018 Walter .............. B01F 33/50115
10,490,992 B1 * 11/2019 Robertson .............. H02G 13/80
11,084,156 B1 * 8/2021 Jordan .................. E04H 12/347
11,498,196 B2 * 11/2022 Ebner .................. B25D 17/005
11,999,038 B2 * 6/2024 Blair .................... B25D 17/005
(Continued)

*Primary Examiner* — Gloria R Weeks
(74) *Attorney, Agent, or Firm* — Ricky R. Wascher; Interstate IP

(57) ABSTRACT

An impact driver for setting stakes and the like, from the left or right and/or in situations where the stake cannot be hammer struct due to the lack of hammer swing clearance; the invention includes a solid body having a cup and a drive tang configured with an impact wrench anvil receiving drive hole. In use, the anvil of a conventional impact wrench cooperatively engages the body through the drive hole. When actuated, the impact wrench generates a rotational force on the drive tang, which is then transferred to the cup via the spine of the solid body. The result is a repetitive, concussive hammering force for setting stakes or workpiece removal activities.

16 Claims, 3 Drawing Sheets

(56) References Cited

U.S. PATENT DOCUMENTS

| | | | | |
|---|---|---|---|---|
| 2009/0084567 | A1* | 4/2009 | Basham | B25C 7/00 173/29 |
| 2017/0333056 | A1* | 11/2017 | Ponzer | A61B 17/1728 |
| 2018/0258603 | A1* | 9/2018 | Zhang | E02D 7/04 |

* cited by examiner

Fig. 7
SECTION D-D
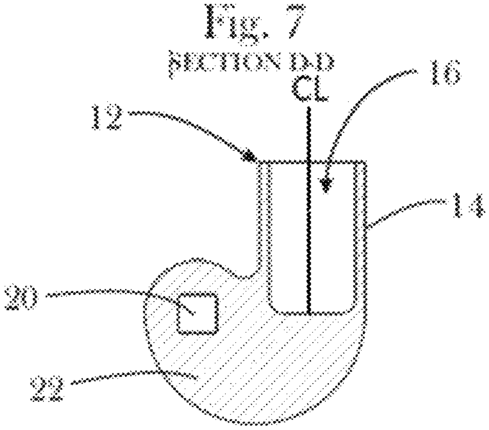
Fig. 8
SECTION C-C
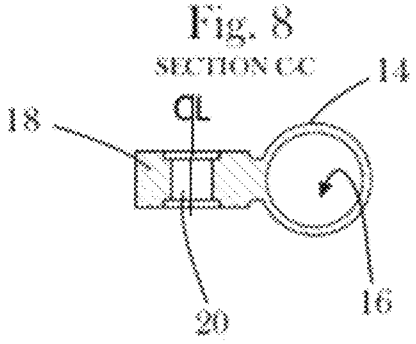
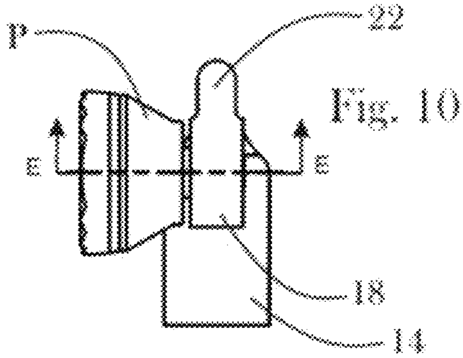
Fig. 10
Fig. 9
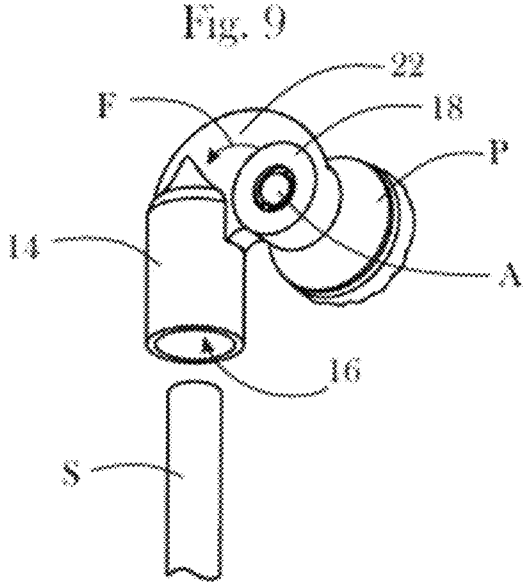
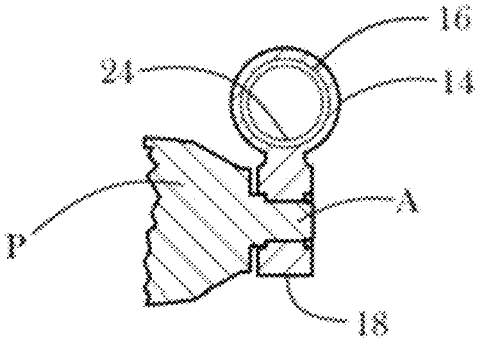
Fig. 11
SECTION E-E

IMPACT DRIVER ATTACHMENT

BACKGROUND OF THE INVENTION

The installation (driving) of stakes, pins, and pilings, etc., (hereafter generally referred to as "stake setting", "setting stakes", to "set stakes" and the like) into a work surface such as the ground or a wall is a common, potentially hazardous, task when using hand tools. Likewise, the removal of pins, bolts, etc., from their installed position in a bore, as well as the forceful separation of materials by hammering and/or chiseling with hand tools (hereafter generally referred to as "workpiece removal") is also a potentially hazardous common task.

The present invention relates to hand tools used for generating and applying a repetitive concussive force during stake-setting or workpiece-removal activities. A common example is a hammer and steel rebar stake. More particularly, the present invention relates to stake setting and workpiece removal using devices configured to transfer a rotational force from a conventional impact wrench and generate repetitively concussive forces for stake setting and workpiece removal.

Every conventional impact wrench includes an anvil that engages and holds a conventional socket tool commonly used to remove or install lug nuts from a wheel and tire assembly. The anvil rotates in response to a power source such as air pressure or an electric motor. The anvil typically utilizes a friction ring or detent pin to secure the socket (or the inventive device as described below) to the anvil by a cooperative engagement between the anvil and the drive hole of the socket (or inventive device) during use. Pneumatic and electric impact wrenches are manufactured and sold by many companies, including but not limited to those associated with the following trademarks for powered tools such as impact wrenches: DEWALT, MILWAUKEE, MAKITA, BOSCH, RYOBI, CRAFTSMAN, SNAP-ON, HILTI, and others. Impact wrenches generate repetitive force, which is converted to a repetitive concussive force for driving a stake using the present invention. Until now, such a device has not been invented.

SUMMARY OF THE INVENTION

The present invention transfers the rotational force from an impact wrench into a repetitive concussive hammering force and applies it to the free end of a stake during stake setting, or to a supplemental tool, such as a chisel or pin punch, when used in conjunction with the present invention. A cooperative engagement between the anvil and the drive hole of the inventive device establishes the force transfer and conversion from the impact wrench to the inventive device and the inventive device converts the rotational force to a repetitive concussive force applied directly to the ground or other work surface, or indirectly to the same when a supplemental tool is used in conjunction with the inventive device. Thus, the preferred power source is an impact wrench.

Until now, a stake-setting or workpiece-removal device capable of generating a repetitive concussive hammering force in response to the rotation of the anvil associated with an impact wrench has not been invented.

It is an object of the present invention to provide an inventive impact driver tool, like the one shown and described herein, configured for safely setting stakes and workpiece removal when using a supplemental tool in response to the rotational force of the anvil powered by the impact wrench.

Another object of the present invention is to provide an inventive stake setting and workpiece removal device that is configured to safely transfer an impact wrench's force and features a unitary body with no moving parts. Thus, the rotation of the impact wrench anvil defines the direction of the force applied when setting stakes or performing workpiece removal activities by hand.

Accordingly, the present invention can be summarized in many ways. For example, the preferred embodiment of the present invention comprises a solid body formed as a single piece of steel, iron, or other suitable hard metal. The body is comprised of a stake-receiving cup and an anvil-receiving drive hole. The central (long) axis of the cup and drive hole are generally perpendicular to one another as viewed along their central axis. More specifically, the centerline axis of the cup is preferably perpendicular to the centerline axis of the drive hole. This offset allows the impact tool to apply a force in one plane, which is converted into a perpendicular force in an orthogonal plane to set stakes or effectively engage in workpiece removal activities by the repetitive concussive hammering energized by the impact wrench.

The present invention may be summarized as follows: A stake setting impact driver device comprising a body having a drive tang and an impact cup interconnected by a spine, wherein the drive tang has a drive hole configured to receive a power source. The impact cup preferably includes a bottom surface, a cylindrical side wall that surrounds and extends outwardly from the bottom surface, a stake-receiving opening opposite the bottom, and a stake-receiving well defined by the bottom, the side wall, and the stake-receiving opening. Therefore, both the cup and the drive hole have a centerline. The centerlines of the cup and drive hole are preferably orthogonal to each other.

An alternate embodiment of the cup includes a beveled or convex bottom surface. The preferred embodiment of the body is unitary, forming a single-piece structure. The alternate embodiment is a modular body having a detachable cup. A power source, such as an impact wrench having an anvil configured for cooperative engagement of the drive tang at the drive hole, provides the power for the preferred embodiments.

The method of using the present invention may be summarized as follows: A method of setting a stake using a stake setting device, including the steps of: providing a stake setting impact driver device having a drive tang configured with a drive hole, an impact cup having a stake receiving well with a bottom surface, and a spine connecting the drive tang and cup; providing a power source and attaching it to the drive tang at the drive hole; placing the cup over the free end of the stake to be driven; positioning the cup so the bottom surface of the stake receiving well is in contact with the free end of the stake when stake setting or a supplemental tool for workpiece removal activities; energizing the power source enabling it to impart a rotational force on the device at the drive hole.

The preferred power source of the inventive method has an anvil configured for cooperative engagement with the drive tang at the drive hole and connecting the drive tang to the anvil. The application of a guiding hand force is applied to the spine by the user's hand.

The present invention may also be summarized as a powered system for setting stakes and workpiece removal, from the left or right, and in situations where the stake (or workpiece) cannot be hammer struck due to a lack of hammer swing clearance, as follows: an impact driver comprising: a body having a drive tang and an impact cup interconnected by a spine; a drive hole formed in the drive tang and configured to receive a power source; and a power source connected to the drive tang by a cooperating engagement with the drive hole. The preferred power source is an impact wrench. The anvil and drive hole are cooperatively configured for operable engagement with each other. The alternate embodiments of the impact cup feature a flat, beveled, or convex bottom surface, a cylindrical side wall that surrounds and extends outwardly from the bottom surface, a stake-receiving opening opposite the bottom, and a stake-receiving well defined by the bottom, the side wall, and the stake-receiving opening.

Given the fact that stakes, pins, posts, or supplementary tools such as chisels and pin punches vary in size, diameter, and/or configuration, a cup that is integral with the body or removable therefrom may be uniquely configured for a particular stake-setting application, such as in setting fence posts where the cross-section of the fence post is a non-circular T-shape.

Therefore, a removable cup is contemplated to be within the scope of the preferred alternate embodiments of the present invention, and a cup configured to receive a supplementary tool, such as a chisel or pin punch, is also within the scope of the preferred embodiments of the present invention.

It is an object, feature, and advantage of the present invention to provide an inventive device that is equally useful from left and right hand positions, and in applications where hammering a stake into a receiving surface is not possible due to the lack of space needed to swing the hammer.

BRIEF DESCRIPTION OF THE DRAWINGS

FIG. 7 is a section view taken along line D-D of FIG. 3.

FIG. 8 is a section view taken along line C-C of FIG. 2.

FIG. 9 is an elevated perspective view of the preferred embodiment shown in cooperative engagement with an anvil and power source.

FIG. 10 is a back view of the preferred embodiment as shown in FIG. 9.

FIG. 11 is a section view taken along line E-E of FIG. 10.

DETAILED DESCRIPTION OF THE PREFERRED EMBODIMENTS

Figure 1:
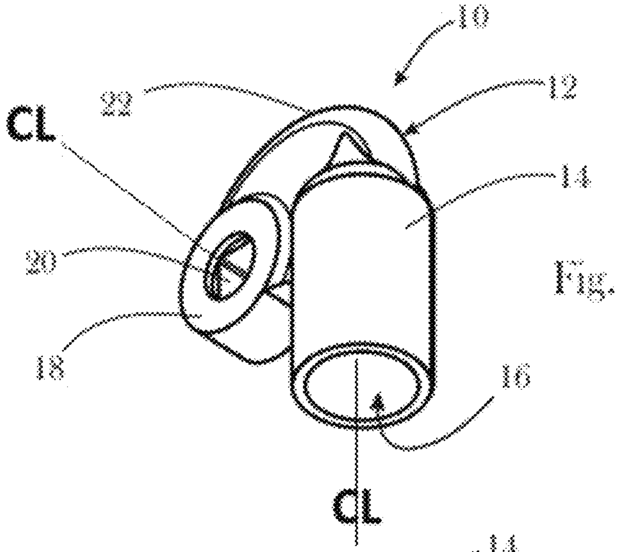
FIG. 1 is an elevated perspective view of a preferred embodiment of the present invention.
Figure 6:
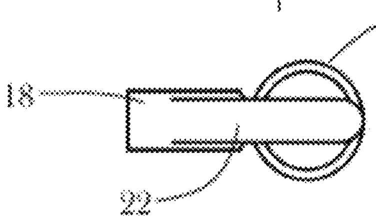
FIG. 6 is a top view from a position opposite the bottom end view shown in FIG. 4.
Figure 5:
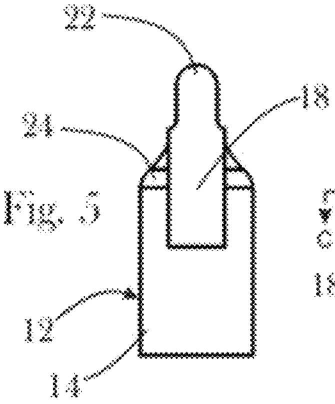
FIG. 5 is a back view of the embodiment shown in FIG. 1 and opposite FIG. 3.
Figure 2:
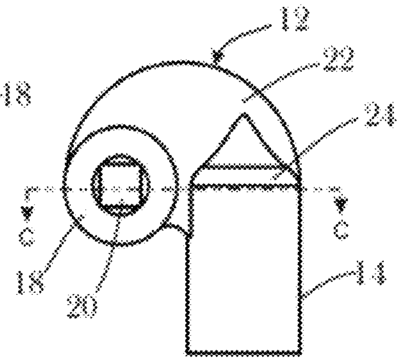
FIG. 2 is a side view of the embodiment shown in FIG. 1.
Figure 3:
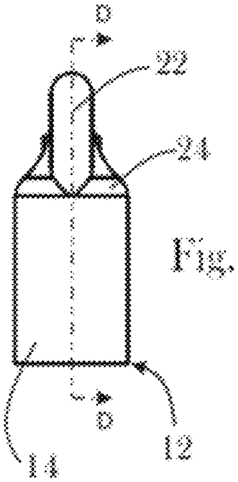
FIG. 3 is a front view, closest to the cup, of the embodiment shown in FIG. 1.
Figure 4:
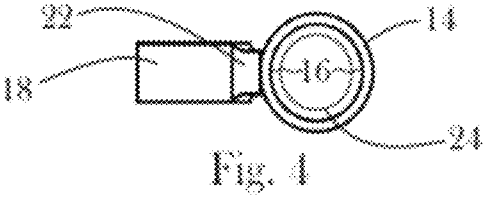
FIG. 4 is a bottom end view of the preferred embodiment shown in FIG. 1.

With reference to FIGS. 1 through 8, the preferred embodiment of the present invention is designated generally by reference numeral 10. Invention 10 comprises a solid body 12 with a stake-receiving cup 14 having an interior stake-receiving well 16 formed therein. Cup 14 is adjacent to a drive tang 18, which has a drive hole 20. Drive tang 18 and cup 14 are joined by the spine 22, partially comprising the drive tang 18. With specific reference to FIGS. 2, 3, and 5, the bottom of well 16 may have a beveled or angled surface 24, or a flat bottom, as shown in FIG. 7. The centerline axis of the cup CL is preferably perpendicular to the centerline axis of the drive hole CL as shown in FIGS. 1, 7, and 8.

Regarding FIGS. 9 through 12, the preferred embodiment of FIG. 1 has a power source designated generally by the reference letter P. The power source has an anvil designated generally by the reference letter A. Stake, designated generally by the reference letter S, is placed in alignment with the cup 14 (and well 16) and sized to fit within the well 16 thereof (see FIGS. 9 and 12).

Figure 12:
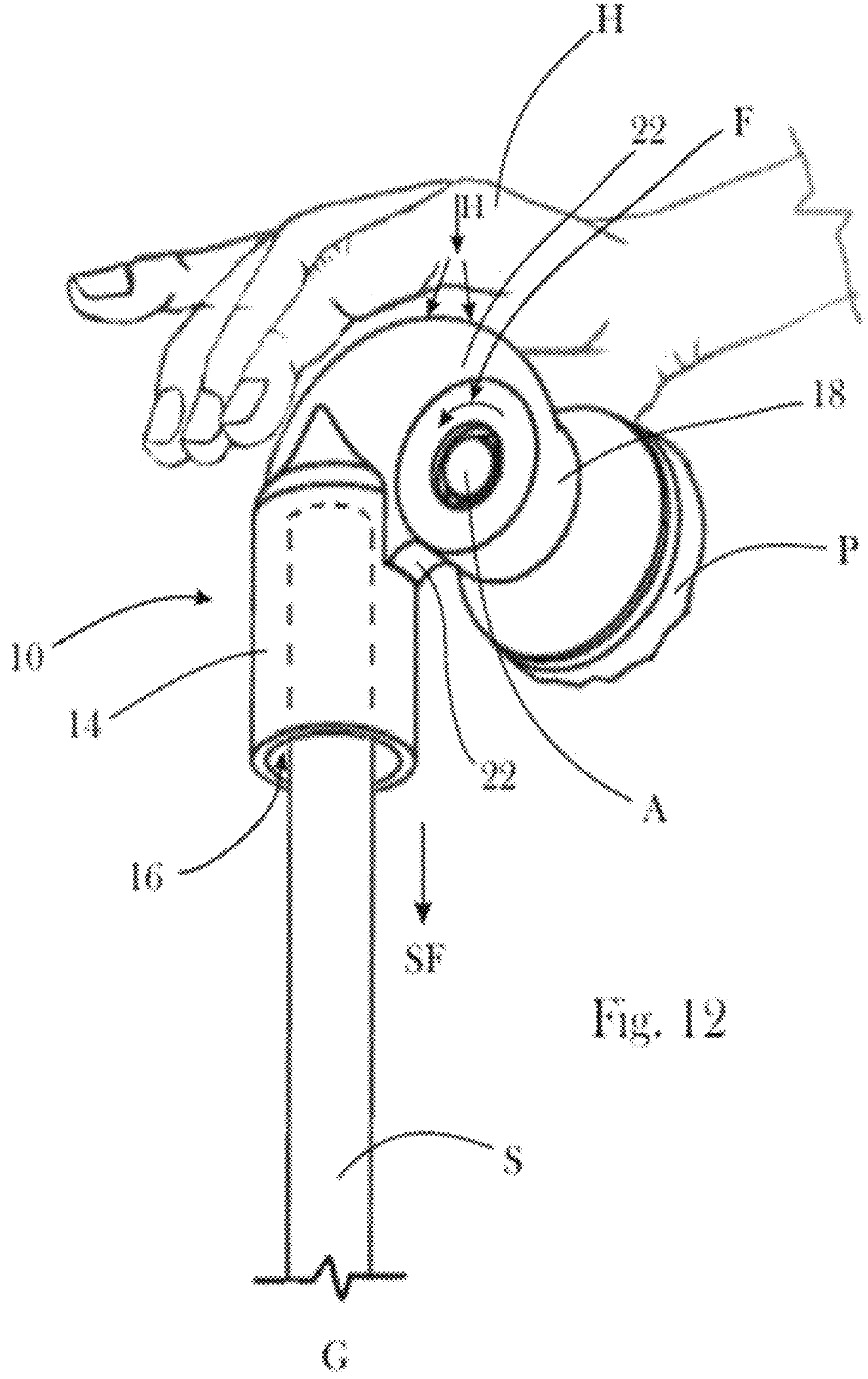
FIG. 12 is an elevated perspective view similar to that shown in FIG. 9, with a human hand drawn in operable relationship to the preferred embodiment when used.

Concerning use of the present invention and FIGS. 1 through 12, the preferred embodiment of the present invention 10 is cooperatively attached to a power source P having an anvil A inserted into the drive hole 20 of the drive tang 18 as stated previously. The operator applies a downward force by hand, as shown generally in FIG. 12 and designated generally by the reference letter F, to the spine 22 of the drive tang 18 by pressing down on the spine 22. The force from the source P has a circular arc designated generally by the arced arrow on spine 22 as seen in FIGS. 9 and 12.

When activated, power source P imparts the rotational force to the cup 14, which in turn imparts a hammer force on stake S when the stake is pushed against the bottom of the cup 16 by hand H. An impact wrench is the preferred power source. When the user presses down on the spine 22 while the stake S is inside the well 16, stake S contacts the bottom of the well.

Energizing the impact wrench generates a rotational force on the anvil A and body 12 due to the cooperative engagement of the anvil A and drive hole 20. Simultaneously pressing down on the spine 22 while energizing the impact wrench causes the inventive device to safely hammer the supplementary tool or stake S inside the cup 14. The motion of the cup 14 against the stake (or tool) S, and a downward force applied by hand H safely drives the stake (or tool) S into the work surface or ground G. See the dashed lines of FIG. 12, consistent with the arrow SF designating the force on the tool (or stake) SF.

These and other embodiments are considered within the scope of the invention. For example, depending upon the scale of the application, the inventive device may be quite large or small, used in an array, or in conjunction with a generic force H applied to the spine, all of which are contemplated within the scope of the present invention.

What is claimed is:

1. A stake setting impact driver device, comprising:

a body having a drive tang and an impact cup connected by a spine;

a drive hole having a drive hole centerline is formed in the drive tang and configured to receive a power source;

wherein the impact cup has a bottom surface, a cylindrical side wall surrounding and extending outwardly from the bottom surface, a tool receiving opening opposite the bottom, an impact cup centerline, and a stake receiving well defined by the bottom, the side wall, and the stake receiving opening; and the centerline of the impact cup and the centerline of the drive hole are orthogonal.

2. The device of claim 1, wherein:

the bottom surface is beveled or convex in a direction away from the tool receiving opening.

3. The device of claim 1, wherein:

the power source is a cordless impact wrench having an anvil configured for cooperative engagement of the drive tang at the drive hole.

4. The impact driver of claim 1, wherein the body is modular and further comprises:

a detachable cup.

5. A method of using a stake setting and workpiece removal device, including the steps of:

providing an impact driver device having a drive tang configured with a drive hole having a drive hole centerline and an impact cup joined by a spine, wherein the impact cup has a stake receiving well with a bottom surface and an impact cup centerline that is orthogonal to the drive hole centerline;

positioning the stake having a work surface engaging end and a free end so that the work surface engaging end is in contact with the work surface;

providing an impact wrench power source and attaching it to the drive tang at the drive hole;

placing the cup over the free end of the stake to be driven;

positioning the cup so the bottom surface of the stake receiving well is in contact with the free end of the stake or supplementary tool;

energizing the power source for imparting a rotational force on the device; and applying a guide force to the spine while the power source is energized to maintain contact between the bottom surface of the well and the tool or stake.

6. The method of claim 5, wherein:

the power source has an anvil configured for cooperative engagement with the drive tang at the drive hole, and connecting the drive tang to the anvil.

7. The method of claim 5, wherein the application of the guide force to the spine is done by the hand of the user.

8. The method of claim 5, wherein the power source is an impact wrench, and energizing the power source to impart the rotational force on the device.

9. The method of claim 5, wherein:

providing a stake setting device further includes a detachable cup; and attaching the cup before the device is used.

10. An impact driver for setting stakes and the like, from the left or right, and in situations where the stake cannot be hammer struck due to a lack of hammer swing clearance, the inventive driver comprising:

a body having a drive tang and an impact cup connected by a spine;

a drive hole formed in the drive tang wherein the drive hole has a drive hole centerline and is configured to receive a power source;

an impact cup having a centerline wherein the impact cup centerline and drive hole centerline are orthogonal to one another; and a power source connected to the drive hole by a cooperating engagement.

11. The impact driver of claim 10, wherein:

the power source is an impact wrench.

12. The impact driver of claim 11, further comprising:

an anvil associated with the impact wrench wherein the anvil and drive hole are cooperatively configured for operable engagement with each other.

13. The impact driver of claim 12, wherein:

the impact cup has a bottom surface, a cylindrical side wall surrounding and extending outwardly from the bottom surface, a stake and tool receiving opening opposite the bottom, and a stake and tool receiving well defined by the bottom, the side wall, and the stake receiving opening.

14. The impact driver of claim 13, wherein:

the bottom surface is beveled in a direction away from the stake receiving opening.

15. The impact driver of claim 13, wherein:

the impact cup is removable from the body.

16. The impact driver of claim 10, further comprising:

a modular body having a detachable impact cup.

* * * * *